United States Patent [19]

Owens et al.

[11] Patent Number: 5,162,384

[45] Date of Patent: Nov. 10, 1992

[54] MAKING FOAMED PLASTIC CONTAINING PERFLUORINATED HETEROCYCLIC BLOWING AGENT

[75] Inventors: John G. Owens, Ramsey, Minn.; Koen Focquet, Antwerp, Belgium; Richard M. Flynn, Washington, Minn.; Rudolf J. Danis, Antwerp, Belgium

[73] Assignee: Minnesota Mining and Manufacturing Company, St. Paul, Minn.

[21] Appl. No.: 759,415

[22] Filed: Sep. 13, 1991

[51] Int. Cl.$^5$ ............................................. C08G 18/14
[52] U.S. Cl. .................................. 521/110; 521/112; 521/115; 521/131; 252/182.17; 252/182.23; 252/182.24; 252/182.25; 252/308; 252/358
[58] Field of Search ............... 521/110, 112, 115, 131; 252/182.17, 182.23, 182.24, 182.25, 308, 358

[56] References Cited

U.S. PATENT DOCUMENTS

| | | | |
|---|---|---|---|
| 3,404,105 | 10/1968 | Rossmy | 260/2.5 |
| 3,518,288 | 6/1970 | Haluska | 260/448.2 |
| 3,519,579 | 7/1970 | Kanner et al. | 260/2.5 |
| 3,594,334 | 7/1971 | Martin | 260/2.5 |
| 3,723,392 | 3/1973 | Konig et al. | 260/75 NP |
| 3,787,351 | 1/1974 | Olson | 260/40 R |
| 4,156,636 | 5/1979 | Muller et al. | 204/77 |
| 4,205,138 | 5/1980 | Muller et al. | 521/158 |
| 4,221,876 | 9/1980 | Wagner | 521/158 |
| 4,247,653 | 1/1981 | Wagner | 521/158 |
| 4,255,529 | 3/1981 | Mohring et al. | 521/158 |
| 4,326,086 | 4/1982 | Mohring et al. | 568/388 |
| 4,341,909 | 7/1982 | Schneider et al. | 568/863 |
| 4,668,406 | 5/1987 | Chang | 252/8.75 |
| 4,909,958 | 3/1990 | Najjar | 252/373 |
| 4,972,002 | 11/1990 | Volkert | 521/120 |
| 4,981,879 | 1/1991 | Snider | 521/131 |

FOREIGN PATENT DOCUMENTS

| | | |
|---|---|---|
| 1088523 | 10/1980 | Canada . |
| 0416777A2 | 3/1991 | European Pat. Off. . |
| 2638759 | 3/1978 | Fed. Rep. of Germany . |
| 2706297 | 8/1978 | Fed. Rep. of Germany . |
| 1114428 | 5/1968 | United Kingdom . |
| 1130824 | 10/1968 | United Kingdom . |
| 1151960 | 5/1969 | United Kingdom . |

OTHER PUBLICATIONS

"Cellular Materials", Encyclopedia of Polymer Science and Engineering, vol. 3, pp. 1-59, (2d ed. John Wiley & Sons, 1985).
Encyclopedia, vol. 2, p. 434.
Encyclopedia, vol. 2, p. 437.
Chemical and Engineering News, Jul. 16, 1990, pp. 5-6.
Zaske et al., Journal of Cellular Plastics, Nov.-Dec., pp. 38-45 (1981).
U.S. Ser. No. 07/634006 Moore et al., filed Dec. 26, 1990.

Primary Examiner—Maurice J. Welsh
Attorney, Agent, or Firm—Gary L. Griswold; Walter N. Kirn; Carolyn V. Peters

[57] ABSTRACT

A blowing agent emulsion comprising at least one low boiling, perfluorinated, N-aliphatic, cyclic 1,3-, or 1,4-aminoether blowing agent, a foamable polymerizable reaction mixture, and a fluorochemical surfactant, optionally, a silicone surfactant, and optionally, a catalyst; a foamed plastic, and a process for making thereof.

20 Claims, No Drawings

MAKING FOAMED PLASTIC CONTAINING PERFLUORINATED HETEROCYCLIC BLOWING AGENT

This invention relates to a blowing agent, an emulsion containing perfluoroheterocyclic blowing agent, and surfactant, a foamed plastic containing blowing agents, a process of preparing foamed plastic, and a method of using such foamed plastic, for example, to insulate articles of manufacture, such as appliances with such foams.

According to "Cellular Materials," Encyclopedia of Polymer Science and Engineering, vol. 3, pages 1-59, (2d ed. John Wiley & Sons, 1985), foamed plastic is defined as a plastic in which the apparent density decreases substantially with the presence of numerous cells disposed through its mass. The gas phase in a foamed plastic is generally distributed in cells. Blowing agents produce gas used to generate cells in foamable polymeric materials, for example, to make foamed insulation. Physical blowing agents form cells by a phase change, for example, a liquid may be volatilized or a gas dissolved in a polymer under high pressure. Low boiling liquids, particularly chlorofluorocarbons (CFCs) and hydrochlorofluorocarbons (HCFCs), are used throughout the world on a large scale to produce foamed plastics. However, CFCs and HCFCs are linked to the destruction of the earth's protective ozone layer. See Encyclopedia, vol 2, page 434, supra.

The selection of a blowing agent alternative to a CFC or HCFC is not a simple matter, a low ozone depletion potential is not the sole requirement. Although innumerable chemicals have been proposed as blowing agents, few possess sufficient desirable properties to achieve commercial importance in combination with being environmentally sound. See EPO 0 416 777 A2(-Hodson et al.)

Commercially important liquid blowing agents are aliphatic hydrocarbons and their chloro- and fluoro-derivatives. For example, isomers of pentane, hexane, and heptane are used mainly in the production of very low density polystyrene foam. These liquids tend to be inexpensive and low in toxicity. However, they are highly flammable. See Encyclopedia, vol. 2, page 437, supra.

Production of cellular plastic products, such as cellular polyurethane elastomers and flexible, semi-rigid or rigid polyurethane foams in the presence of catalysts, blowing agents, processing aids or additives is described in numerous patents and publications in the literature.

A survey of methods of producing cellular polyurethane elastomers, polyurethane foams and polyisocyanurate foams, their mechanical properties and their use can be found, for example, High Polymers, Vol. 14, "Polyurethanes," Parts I and II by J. H. Saunders and K. C. Frisch (Interscience Publishers, New York 1962 and 1964), Plastics Handbook, Volume VII, "Polyurethanes," 1st ed. 1966, published by R. Vieweg and A. Hochtlen and 2d ed. 1983, published by G. Oertel (Carl Hanser Verlag, Munich), and "Integral Foams," published by H. Piechota and H. Rohr (Carl Hanser Verlag, Munich, 1975).

Essentially two types of blowing agents are used to produce cellular polyurethanes: (1) low boiling inert liquids that evaporate under the influence of the exothermic polymerization process, for example, alkanes, such as butane or pentane, halogenated hydrocarbons or halogenated fluorocarbons, such as methylene chloride, dichloromonofluoromethane, and trichlorofluoromethane; and (2) chemical compounds that form gaseous blowing agents by means of a chemical reaction or thermal decomposition, such as isocyanate groups reacted with water to produce carbon dioxide.

Although useful, the alkanes tend to be highly flammable. Methylene chloride is the most widely used chlorohydrocarbon blowing agent, it is nonflammable, and since the compound contains chlorine, methylene chloride may be subjected to the same restrictions as chlorofluorocarbons and it is, in addition, a toxic, carcinogenic compound.

According to "Cellular Materials," supra, dichlorodifluoromethane (CFC-12) is used as a blowing agent for extruded polystyrene boardstock, low density polyethylene foams, high density polyethylene foams and polyethylene cross-linked foams. Fluorotrichloromethane (CFC-11) is used as a blowing agent for expanded polystyrene loose-fill packaging materials, rigid polyvinyl chloride, low density polyethylene foams, high density polyethylene foams and polyethylene cross-linked foams. For polyethylene foams, 1,2-dichlorotetrafluoroethane (CFC-114), or dichlorodifluoromethane alone or combined with other fluorocarbons and some chemical blowing agents are generally preferred for producing low density polyethylene foam.

Monochlorodifluoromethane (HCFC-22), a gas at room temperature, is generally the blowing agent of choice to foam fluoropolymers and other engineering thermoplastics.

As discussed in Chemical and Engineering News, Jul. 16, 1991, pages 5-6, physical blowing agents, particularly, CFCs, and HCFCs, are used throughout the world on a large scale to produce polyurethane foams and polyisocyanurate foams. However, CFCs and HCFCs are linked to the destruction of the earth's protective ozone layer. Depletion of the ozone layer is likely to result in increased cases of skin cancer and ecosystem damage. Consequently, the major culprits are to be phases out by the year 2000, under the U.S. Clean Air Act and the Montreal Protocol. However, many environmental groups are calling for faster phase-out. Some European countries, in particular Germany, are requiring that all CFCs be replaced in polyurethane foams and polyisocyanurate foams by 1995.

A recent patent, U.S. Pat. No. 4,972,002 (Volkert), describes producing cellular plastics by the polyisocyanate polyaddition process by reaction of (a) organic and/or modified organic polyisocyanates with (b) at least one high molecular compound with at least two reactive hydrogen atom and, optionally, (c) low molecular weight chain extenders and/or cross-linking agents in the presence of (d) blowing agents, (e) catalysts, (f) additives and/or processing aids, wherein the blowing agents are low boiling fluorinated aliphatic and/or cycloaliphatic hydrocarbons that have 3 to 8 carbons. For example, perfluorocyclopentane is used as a preferred blowing agent.

Another recent patent, U.S. Pat. No. 4,981,879 (Snider), describes a process for preparing cellular polymers having urethane groups, isocyanurate groups, or both. The cellular polymers are prepared by reacting an organic polyisocyanate with a polyol in the presence of a blowing agent, typically a hydrocarbon, hydrochlorofluorocarbon, or chlorofluorocarbons, a catalyst and a perfluorinated hydrocarbon or a mixture of perfluorinated hydrocarbons, such that the lower boiling perfluorinated hydrocarbons can function as a co-blowing agent.

Briefly, in one aspect of the present invention, a blowing agent (or foaming agent) emulsion is provided comprising as a blowing agent a low boiling, perfluorinated, N-aliphatic cyclic aminoether (for brevity is referred to hereinafter as cyclic aminoether). "Perfluorinated" as used in this application means that essentially all hydrogen atoms have been replaced with fluorine atoms.

The blowing agent is useful for producing foamed plastics by producing gas to generate cells (gas pockets) in foamable polymeric materials.

The blowing agents used in the present invention are odorless, nontoxic, noncorrosive, and nonflammable. The blowing agents are low boiling, typically boiling in the range of 0° to 175° C., preferably in the range of 30° to 125° C., and more preferably in the range of 25° to 100° C. Furthermore, the blowing agent can also be a mixture of the cyclic aminoethers, and further conventional physical blowing agents, such as hydrocarbons, for example, alkane; halohydrocarbons, for example monochlorodifluoromethane, chlorofluorocarbons, for example, fluorotrichloromethane, dichlorodifluoromethane or perfluorinated compounds, for example, perfluoro pentane, perfluoro N-methyl pyrrolidine, may be added to the perfluorinated, N-aliphatic cyclic 1,3- or 1,4-aminoether blowing agent used in the present invention. The conventional blowing agents when used, may be mixed with the cyclic aminoether in an amount in the range of 0.5% to 99.5% by weight of the total amount of the mixture, preferably in the range of 40.0% to 95.0% by weight, and more preferably in the range of 75.0% to 90.0% by weight. Although halohydrocarbons and/or chlorofluorocarbons may be used in the blowing agent emulsion of the present invention it is preferred that a blowing agent mixture of cyclic aminoethers and conventional blowing agent contains no more than 5% by weight of the mixture of halohydrocarbons and/or chlorofluorocarbons. It is also within the scope of the present invention to add chemical compounds to the emulsion that form gaseous blowing agents by means of a reaction or thermal decomposition, such as, isocyanate groups reacted with water to produce $CO_2$. The blowing agents are thermally stable and chemically inert in the gaseous form and do not have deleterious effects on the physical or chemical properties of the foamed plastic.

A class of cyclic aminoethers particularly useful as blowing agents in the present invention are 5- or 6-membered perfluorinated N-aliphatic cyclic 1,3- or 1,4-aminoethers, such as those represented by the following general formula:

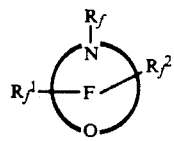

(I)

wherein $R_f$ is a perfluoroaliphatic saturated or unsaturated, group having, for example, 1 to 4 carbon atoms, $R^1_f$ and $R^2_f$ are, independently, a fluorine atom or a perfluoroaliphatic saturated or unsaturated, group having, for example, 1 to 4 carbon atoms, the total carbon atom content of the compound not exceeding 12 carbon atoms, and preferably the total carbon atom content does not exceed 10 carbon atoms. The designation "F" in the ring is a conventional symbol that denotes the saturated ring is fully fluorinated, that is, all ring carbon atoms are bonded to fluorine atoms, except as depicted.

A first sub-class of blowing agents is perfluorinated, N-aliphatic morpholine, such as those represented by the following general formula:

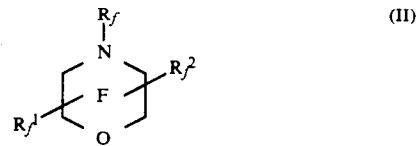

(II)

wherein $R_f$ is a perfluoroaliphatic group, saturated or unsaturated, having, for example, 1 to 4 carbon atoms, and $R^1_f$ and $R^2_f$ are as defined above.

The perfluorinated N-aliphatic morpholines useful in the present invention are commercially available or known in the literature.

A second sub-class of blowing agents is a mixture of perfluorinated, N-alkyl, 2,5-aliphatic-substituted-1,3-oxazolidine (for brevity referred to hereinafter as oxazolidine) and perfluorinated, N-alkyl, 2,5-aliphatic-substituted-1,3-oxazine (for brevity referred to hereinafter as oxazines), such as those respectively represented by the following general formulae:

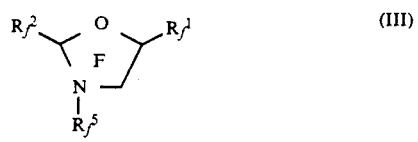

(III)

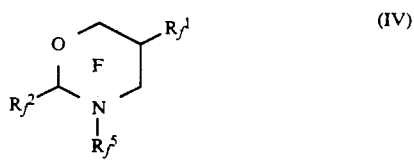

(IV)

wherein $R^5_f$ is a perfluoroalkyl group having, for example, 1 to 4 carbon atoms, $R^1_f$, and $R^2_f$ are as defined above.

The oxazolidines and oxazines useful in the present invention can be prepared by electrochemical fluorination of hydrocarbon or partially fluorinated precursors. Generally, the precursors used are perfluorinatable, N,N-dialkyl carboxamides. A mixture of perfluorinated, aliphatic-substituted 2-dialkylaminotetrahydrofuran and perfluorinated, aliphatic-substituted 2-dialkylaminodihydropyran may also be present in the mixture of oxazolidines and oxazines. The process for preparing oxazolidines and oxazines from perfluorinatable, N,N-dialkyl carboxamides is described in U.S. patent application Ser. No. 07/634,006, filed Dec. 26, 1990, and the description of such is incorporated herein by reference.

In another aspect of the present invention, a blowing agent emulsion for making polyurethane foam is provided comprising (a) at least one high molecular weight compound with at least two reactive hydrogen atoms, such as a polyol, typically used in making foamed polyurethane, (b) a low boiling, perfluorinated N-aliphatic cyclic aminoether blowing agent and (c) a fluorochemical surfactant. Additionally, a silicone surfactant may be added to the blowing agent emulsion. Furthermore, the second component of a polyurethane, that is, an organic and/or modified organic polyisocyanate may be added to the emulsion in the absence of a polymerizing catalyst, which is added just prior to foaming the emulsion. Alternatively, a polymerizing catalyst may be added to the emulsion, and then the emulsion is added to an organic or modified organic polyisocyanate.

The blowing agent emulsion should remain sufficiently stable, that is, not phase-separate, long enough to prepare a foamed plastic. However, it is preferred that the emulsion is stable for at least one day at room temperature, and more preferably for at least one week at room temperature.

In another aspect of the present invention, a foamed plastic, such as foamed polyurethane, is provided prepared from an emulsion comprising (a) a foamable polymerizable precursor mixture wherein the polymerizable precursor comprises (i) at least one high molecular weight compound with at least two reactive hydrogen atoms, and (ii) an organic and/or modified organic polyisocyanate, (b) a low boiling, perfluorinated N-aliphatic cyclic aminoether blowing agent, (c) a fluorochemical surfactant, (e) optionally, a silicone surfactant, and (f) optionally, one or more other conventional components of foam formulation such as, fillers, flame retardants, or colorants.

A class of fluorochemical surfactants suitable for use in the present invention are fluoroaliphatic oligomers, such as those represented by the following general formulae:

$$(R_f^A)_m Q[R^4 Q'A]_n \quad (VI)$$

$$[(R_f^A)_m Q[R^4 Q'A]_n]_z \quad (VII)$$

wherein $R^4_f$ is a fluoroaliphatic group, $R^4$ is a water solubilizing divalent organic group free of functional groups containing active hydrogen atoms, such as poly(oxyalkylene) or alkylene, Q is a linkage through which $R^4_f$ and $R^4$ radicals are covalently bonded together, A is a monovalent terminal organic group, A' is A or a valence bond, with the proviso that at least one A' is a valence bond connecting a Q-bonded $R^4$ group to another Q, Q' is a linkage through which A, or A', and $R^4$ are covalently bonded together, m is an integer of at least 2, and can be as high as 25 or higher, n is an integer of at least 2, and can be as high as 60 or higher, and z is an integer of 2 or higher, and can be as high as 30 or higher. Specific examples of fluorochemical surfactants are described in U.S. Pat. Nos. 3,787,351 and 4,668,406, which descriptions are incorporated herein by reference. Fluoroaliphatic oligomers are commercially available from Minnesota Mining and Manufacturing Company, St. Paul, Minn.

A class of silicone surfactants suitable for use in the present invention are those represented by the following formula described in Zäske et al., Journal of Cellular Plastics, November–December, pg. 38–45 (1981):

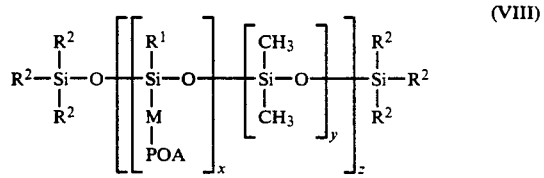

(VIII)

wherein $R^1$ and $R^2$ are a lower alkyl group, for example, containing 1 to 8 carbon atoms, M is a divalent linking group, such as alkylene $(CH_2)_q$ where q is 0 to 10, POA is $(C_nH_{2n}O)_m R^1$ consisting of polyoxyethylene and polyoxypropylene units, for example, in weight ratio of 50:50 to 80:20, n is an integer 1 to 4, m is an integer such that the molecular weight of the POA is in the range of 1400 to 3000. The average molecular weight of the surfactant is generally from about 2000 to 20,000, and preferably between 5000 and 50,000.

Silicone surfactants suitable for use in the present invention are also described, for example, in U.S. Pat. Nos. 3,404,105, 3,519,579, 3,518,288, and 3,594,334 and U.K. Patent Nos. 1 114 428, 1 130 824, 1 130 824, and 1 151 960. Silicone surfactants are commercially available for example from Dow Corning, and Union Carbide.

Foamable polymerizable reaction mixtures that can be used in the practice of this invention to produce foamed plastic include polymerizable reaction mixtures of styrene or substituted styrene homopolymers or copolymers with butadiene and acrylonitrile; vinyl chloride homopolymers or co-polymers with other vinyls; ethylene homopolymers and co-polymers with varying percentages of the materials, for example, 2-butene or acrylic acid, propylene, or butadiene; isocyanate-derived polymers, such as, polyurethanes and polyisocyanurates; and phenolic homopolymers (for example, resoles and novolacs). Preferably, the foamed plastics of the present invention are polyurethane foams and polyisocyanurate foams which can be used where conventional polyurethane and polyisocyanurate foams can be used.

The organic polyisocyanate component of the polyurethane precursor reaction mixture that can be cured or polymerized with the perfluorinated blowing agent of the present invention may be any aliphatic, cycloaliphatic, arylaliphatic, aromatic, or heterocyclic polyisocyanate, or any combination of such polyisocyanates.

As examples of polyisocyanates there may be mentioned any of the polyisocyanates proposed in the literature for use in the production of foams. Of particular importance are aromatic diisocyanates, such as tolylene and diphenylmethane diisocyanate in pure, modified or crude forms. Special mention may be made of MDI variants or modified organic polyisocyanate (diphenylmethane diisocyanate modified by the introduction of urethane, allophanate, urea, biuret, carbodiimide, uretonimine, or isocyanurate residues) and the mixture of diphenyl diisocyanate(s) and oligomers thereof known in the art as "crude" or "polymeric" MDI (polymethylene polyphenylene polyisocyanates).

Examples of polyisocyanates that can be used in this invention are as follows: ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate, and mixtures of these isomers, diisocyanato-3,3,5-trimethyl-5-isocyanatomethyl cyclohexane, 2,4- and 2,6-hexahydrotolylene diisocyanate, and mixtures of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate, and mixtures of these isomers, diphenylmethane-2,4'- and/or -4,4'-diisocyanate, naphthalene-1,5-diisocyanate, and the reaction products of four equivalents of the aforementioned isocyanate-containing compounds with compounds containing two isocyanate-reactive groups. See U.S. Pat. No. 4,972,002 (Volkert) describing the various polyisocyanates and polyols useful in practicing the present invention, and such description is incorporated herein by reference.

According to the present invention, it is also possible, for example, to use triphenyl methane-4,4',4''-triisocyanate, polyphenyl polymethylene polyisocyanates, m- and p-isocyanatophenyl suphonyl isocyanates, perchlorinated aryl polyisocyanates, polyisocyanates containing carbodiimide groups, norbornane diisocyanates, polyisocyanates containing allophanate groups, polyisocyanates containing isocyanurate groups, polyisocyanates containing urethane groups, polyisocyanates containing acrylated urea groups, polyisocyanates containing biuret groups, polyisocyanates produced by telomerization reactions, polyisocyanates containing ester groups, reaction products of the above-mentioned diisocyanates with acetals and polyisocyanates containing polymeric fatty acid esters.

It is within the scope of this invention to use distillation residues having isocyanate groups obtained in the commercial production of isocyanates, optionally in solution in one or more of the above-mentioned polyisocyanates. It is within the scope of this invention to use any mixtures of the above-mentioned polyisocyanates.

Suitable compounds which can be reacted with the polyisocyanates in the practice of this invention are those containing at least 2 isocyanate-reactive hydrogen atoms. Such compounds can be high or low molecular weight compounds, having a weight average molecular weight, generally from about 50 to 50,000. In addition to compounds containing amino groups, thiol groups, or carboxyl groups, are preferably, compounds containing hydroxyl groups, particularly compounds containing from about 2 to 50 hydroxyl groups and above all, compounds having a weight average molecular weight of from about 500 to 25,000, for example, polyesters, polyethers, polythioethers, polyacetals, polycarbonates, polymethacrylates, and polyester amides, containing at least 2, generally from about 2 to 8, but preferably from about 2 to 4 hydroxyl groups, or even hydroxyl-containing prepolymers of these compounds and a less than equivalent quantity of polyisocyanates, of the type known for the production of polyurethanes.

Representatives of the above-mentioned compounds used in accordance with the present invention are described, for example, in Saunders and Frisch, supra, Kuntstoff-Handbunch, supra. It is, of course, possible to use mixtures of the above-mentioned compounds containing at least two isocyanate-reactive hydrogen atoms and having a molecular weight of from about 50 to 50,000 for example, mixtures of polyethers and polyesters.

In some cases, it is particularly advantageous to combine low-melting and high-melting polyhydroxyl containing compounds with one another, as described in German Offenlegungsschrift No. 2,706,297.

Low molecular weight compounds containing at least two isocyanate-reactive hydrogen atoms (molecular weight from about 50 to 400) suitable for use in accordance with the present invention are compounds preferably containing hydroxyl groups and generally containing from about 2 to 8, preferably from about 2 to 4 isocyanate-reactive hydrogen atoms. It is within the scope of this invention to use mixtures of different compounds containing at least two isocyanate-reactive hydrogen atoms and having a molecular weight in the range of from about 50 to 400. Examples of such compounds are ethylene glycol, 1,2- and 1,3-propylene glycol, 1,4- and 2,3-butylene glycol, 1,5-pentane diol, 1,6-hexane diol, 1-8-octane diol, neopentyl glycol, 1,4-bishydroxymethyl cyclohexane, 2-methyl-1,3-propane diol, dibromobutene diol (U.S. Pat. No. 3,723,392), glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxyl diphenyl propane and dihydroxy methyl hydroquinone.

Other polyols suitable for the purposes of the present invention are the mixtures of hydroxy aldehydes and hydroxy ketones ("formose") or the polyhydric alcohols obtained therefrom by reduction ("formitol") that are formed in the autocondensation of formaldehyde hydrate in the present of metal compounds as catalysts and compounds capable of enediol formation as cocatalysts (German Offenlegungsschrift Nos. 2,639,084, 2,714,084, 2,714,104, 2,721,186, 2,738,154, and 2,738,512). Solutions of polyisocyanate polyaddition products, particularly solutions of polyurethane ureas containing ionic groups and/or solutions of polyhydrazodicarbonamides, in low molecular weight polyhydric alcohols may also be used as the polyol component in accordance with the present invention (German Offenlegungsschrift No. 2,638,759).

Many other compounds containing isocyanate-reactive hydrogen atoms and polyisocyanates are useful in the present invention, and will be apparent to those skilled in the art of polyurethane science and technology, in light of this specification.

The foams of this invention containing urethane groups or urethane and isocyanurate groups can be produced with or without the use of chain extenders and/or crosslinking agents. To modify the mechanical properties, for example, hardness, however, it is known to be advantageous to add chain extenders, crosslinking agents or a mixture thereof. Suitable chain extenders and/or crosslinking agents include diols, and triols with a molecular weight of less than 400. Examples include aliphatic, cycloaliphatic, arylaliphatic diols with 2 to 14 carbon atoms. Specific examples of diols include but are not limited to ethylene glycol, 1,3-propanediol, 1,10-decandiol, o-, m-, and p-dihydroxycyclohexane, diethylene glycol, dipropylene glycol, 1,4-butanediol, 1,6-hexanediol, and bis(2-hydroxyethyl)hydroquinone. Some examples of triols include but are not limited to 1,2,4- and 1,3,5-trihydroxycyclohexane, glycerol, trimethylolpropane and low molecular weight hydroxyl group containing polyalkylene oxides based on ethylene oxide and 1,2-propylene oxide.

In addition to the aforementioned diols and triols, it is also within the scope of this invention to use secondary aromatic diamines, primary aromatic diamines, 3,3'-di- or 3,3',5,5'-tetraalkyl-substituted diaminodiphenylmethanes.

Examples of secondary aromatic diamines include N,N'-dialkyl-substituted aromatic diamines, which may optionally be substituted on the aromatic ring by alkyl groups, where there are 1 to 20 carbon atoms in the N-alkyl group, such as N,N'-diethyl, N,N'-di-sec-pentyl, N,N'-di-sec-hexyl, N,N'-di-sec-decyl, N,N'-dicyclohexyl-p- and -m-phenylenediamine, N,N'-dimethyl, N,N'-dicyclohexyl-4,4'-diaminodiphenylmethane, and N,N'-di-sec-butylbenzidine.

The chain extenders or crosslinking agents may be used individually or as mixtures of the same of different types of compounds.

If chain extenders, crosslinking agents or mixtures thereof are used, they are generally used in the amounts of 2 to 60 wt %, based on the weight of the components.

Blowing agents used to practice this invention, may be emulsified in either one of the polyurethane precursor components or in mixtures of the second component and cross-linking agents to form emulsions.

The blowing agents emulsion according to this invention comprises:

(1) 0.1 to 50 parts by weight of a blowing agent, wherein the blowing agent is selected from the group consisting of at least one low boiling, perfluorinated N-aliphatic, 1,3-, or 1,4 cyclic aminoether such that the total carbon atom content of the cyclic aminoether is no more than 12 carbon atoms, a mixture of cyclic aminoethers, and a mixture of at least one cyclic aminoether and at least one conventional physical blowing agent such as, for example, hydrocarbons, halohydrocarbons, chlorofluorocarbons, (2) 80 to 150 parts by weight of at least one higher molecular weight compound with at least two reactive hydrogen atoms, or mixtures thereof, (3) 80 to 300 parts by weight of at least one organic and/or modified organic polyisocyanate, and low molecular chain extenders and/or crosslinking agents, (4) 0.01 to 10.0 parts by weight of at least one fluorochemical surfactant, (5) 0 to 10 parts by weight of at least one silicone surfactant, and (6) 0 to 50 parts by weight of water.

To produce emulsions containing a blowing agent, polyurethane precursor components or the high molecular weight compound with at least two reactive hydrogens or mixtures thereof and low molecular chain extenders and/or crosslinking agents, and blowing agent are mixed thoroughly together in the presence of the fluorinated surfactant or a mixture thereof with a silicone surfactant at temperatures of 0° to 70° C. If the perfluorinated blowing agents are gaseous at room temperature, they are liquified before or during preparation of the emulsion by applying a pressure of up to 1 Megapascal (MPa) to the reaction mixture.

The best form of perfluorinated blowing agent to produce the foamed polyisocyanate and foamed polyisocyanurate depends on the density that is desired and the amount of water, optionally to be added to the reaction mixture. In general, amounts of 1 to 50 parts by weight blowing agent, based on 100 parts by weight precursor components or high molecular compound with at least two reactive hydrogens and low molecular chain extenders and/or crosslinking agents yield satisfactory results.

Suitable polymerization catalysts for producing the foamed plastics of this invention include especially compounds that greatly accelerate the reaction of the hydroxyl group-containing compounds and optionally, the chain extenders and/or crosslinking agents with the organic polyisocyanates. Catalysts are present in catalytically effective amounts and suitable catalysts are described in U.S. Pat. No. 4,972,002 and EPO 0 364 074 A1, and such descriptions are incorporated herein by reference.

Optionally, other additives and/or processing aids may be incorporated into the reaction mixture to produce the foamed plastics. Examples include surface active substances, foam stabilizers, cell regulators, fillers, colorants, flame retardants, hydrolysis preventing agents, fungicides, bactericides, and other additives and/or processing aids as known to those skilled in the art can be added to the reaction mixture. These additives and/or processing aids can be added in an amount effective for their intended purpose. Generally, the amount of such additives and/or processing aids is in the range of 0.001 to 99.9 parts by weight, per 100 parts by weight of the reaction mixture.

The soft elastic, semirigid, and rigid foams of this invention can be produced with a density of 0.02 to 0.75 $g.cm^{-3}$. The foams can be used, for example, in the automobile industry, aircraft industry, shipbuilding industry, furniture and athletic equipment industry and upholstery materials, housing parts, ski shoes, and ski cores. They are especially suitable as insulation materials in the construction and refrigeration industry.

For example, flexible polyurethane foam of this invention can be used in transportation, principally for passenger car seating, as underlay for carpeting, laminate textile products, engineering packaging, filters, sponges, scrubbers, fabric softener carriers, squeegees, and paint applicators. Rigid polyurethane can be used for insulation. Foam laminates of rigid polyurethane foam are useful for residential sheathing (with aluminum skins) and roofing board (with roofing-paper skins). Metal doors and appliance insulation can be insulated by a foam-in-place process. For example, in refrigeration, the polyurethane foam of the present invention can replace fiberglass insulation. Rigid polyurethane of this invention also used as insulation for refrigerated truck trailers, bodies, and rail cars. Packaging can also be foamed-in-place to protect equipment such as pumps or motors.

Objects and advantages of this invention are further illustrated by the following examples, but the particular materials and amounts thereof recited in these examples, as well as other conditions and details, should not be construed to unduly limit this invention. All materials are commercially available or known in the literature except where otherwise stated or apparent. The comparative cell sizes described in the examples are as follows:

| very fine | 50–70 micrometers ($\mu$m) |
| fine | 70–100 $\mu$m |
| medium | 100–150 $\mu$m |
| large | greater than 150 $\mu$m |

EXAMPLES

EXAMPLE 1

This example illustrates the making of a polyurethane based foam containing perfluoro N-methyl morpholine. All components are parts by weight.

Component A contained:

150 parts by weight of a mixture of polymeric methylene diphenyldiisocyanate, having an average formula

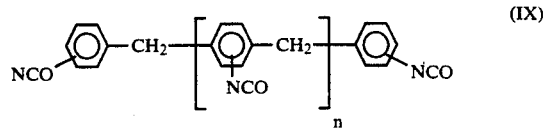

(IX)

wherein n averages 0.7 and has an isocyanate equivalent of 132.

Component B contained:
(1) 100 parts by weight of a polyether polyol with an average hydroxyl number of 500, prepared from the reaction of sorbitol and 1,2-propylene oxide,
(2) 3.0 parts by weight water,
(3) 3.0 parts by weight of an oligomeric fluorochemical surfactant, as described in Example 1 of U.S. Pat. No. 3,787,351,
(4) 0.75 parts by weight of N,N-diethylaminoethanol catalyst (available from Aldrich Chemical),
(5) 0.75 parts by weight of N,N-dimethylcyclohexylamine catalyst (available from Aldrich Chemical), and
(6) 18.8 parts by weight of perfluoro N-methyl morpholine (available from 3M Co.).

Components A and B were admixed in a container at room temperature and vigorously stirred for 15 seconds. Cream time was approximately 15 seconds. The foam rose for about 2 minutes (rise time). After approximately 15 minutes, the foam was tack-free. The product was a rigid foam having a uniform distribution of very small closed cells. The percentage of closed cells was approximately 90%. The density of the foam was about 25 kg.m$^{-3}$. The thermal conductivity K-factor was 20.5 mW.(m.K)$^{-1}$.

EXAMPLE 2

A foamed plastic was made according to the procedure of Example 1, using a mixture of 1.5 parts by weight of the fluorosurfactant as described in Example 1 of U.S. Pat. No. 3,787,351 and 1.5 parts by weight of a silicone surfactant (L-5340, available from Union Carbide). The results are summarized in Table 1.

EXAMPLE 3

A foamed plastic was prepared according to the procedures of Example 1. All components are parts by weight.

Component A contained:
142.5 parts by weight a mixture of polymeric based methylene diphenyldiisocyanate, having an average formula (IX) (PAPI TM 27, Dow Chemical Co.) and has an isocyanate equivalent of 134.0.

Component B contained:
(1) 100 parts by weight of a polyether polyol with a hydroxyl number of 360 (Voranol TM 360, Dow Chemical Co.), a high sucrose polyether polyol,
(2) 2.5 parts by weight of water,
(3) 2.5 parts by weight of an oligomeric fluorochemical surfactant, as described in Example 1 of U.S. Pat. No. 3,787,351,
(4) 1.25 parts by weight of pentamethyldiethylenetriamine catalyst (Polycat TM 5, Air Products & Chemicals, Inc.),
(5) 1.25 parts by weight of N,N-dimethylcyclhexylamine catalyst (Polycat TM 8, Air Products & Chemicals, Inc.), and
(6) 15.8 parts by weight of perfluoro N-methyl morpholine.

The ingredients of Component B were mixed to obtain an emulsion. The emulsion was then admixed with component A at room temperature and stirred vigorously for approximately 8 seconds. Cream time was approximately 10 seconds. Rise time was approximately 2 minutes. After approximately 3 minutes, the foam was tack-free. The product was a rigid foam having a uniform distribution of fine, closed cells. The results are summarized in Table 1.

EXAMPLE 4

A foamed plastic was prepared according to the procedure of Example 3, using instead of perfluoro N-methyl morpholine, an equimolar amount (18.5 parts by weight) of perfluoro-N-ethyl-2-methyl-1,3-oxazolidine. The product was a rigid foam having a uniform distribution of very fine, closed cells. The results are summarized in Table 1.

EXAMPLE 5

A foamed plastic was prepared according to the procedure of Example 3, using instead of perfluoro N-methyl morpholine, an equimolar amount (18.5 parts by weight) of perfluoro N-ethyl morpholine. The product was a rigid foam having a uniform distribution of very fine, closed cells. The results are summarized in Table 1.

EXAMPLE 6

A foamed plastic was prepared according to the procedure of Example 3, using instead of perfluoro N-methyl morpholine, an equimolar amount (21.1 parts by weight) of perfluoro N-isopropyl morpholine. The product was a rigid foam having a uniform distribution of very fine, closed cells. The results are summarized in Table 1.

EXAMPLE 7

A foamed plastic was prepared according to the procedure of Example 3, using instead of perfluoro N-methyl morpholine, an equimolar amount (12.1 parts by weight) of an equimolar mixture of trifluorodichloroethane (HCFC 123) and perfluoro N-methyl morpholine. The product was a rigid foam having a uniform distribution of very fine, closed cells. The results are summarized in Table 1.

Comparative Example 1

A foamed plastic was made according to the procedure of Example 1, using 3.0 parts by weight of a silicone surfactant (L-5340, available from Union Carbide) as the foam stabilizer. The results are summarized in Table 1.

Comparative Example 2

A foamed plastic was prepared using the process taught in Example 1 of U.S. Pat. No. 4,972,002, using in component B (b(3)), 6.0 parts by weight of a 50% by weight solution of the fluorochemical surfactant according to Example 2 of U.S. Pat. No. 3,787,351 and 19.0 grams n-perfluorohexane as the blowing agent. The results are summarized in Table 1.

Comparative Example 3

A foamed plastic was prepared using the process taught in Example 1 of U.S. Pat. No. 4,972,002, using in component B (b(3)) 0.3 parts by weight of silicone surfactant (L-5340, available from Union Carbide) and 19.0 grams n-perfluorohexane as the blowing agent. The results are summarized Table 1.

Comparative Example 4

A foamed plastic was prepared according to the procedure of Example 3, using instead of perfluoro N-methyl morpholine, an equimolar amount (18.5 parts by weight) of perfluorohexane. The product was a rigid foam having a uniform distribution of fine, closed cells. The results are summarized in Table 1.

TABLE 1

| Example | Cream Time (sec) | Gel Time (min) | Cell-Size |
| --- | --- | --- | --- |
| 1 | 15 | 2 | very fine uniform |
| 2 | 20 | 2.25 | medium uniform |
| 3 | 10 | 0.75 | very fine uniform |
| 4 | 10 | 0.75 | very fine uniform |
| 5 | 10 | 0.75 | very fine uniform |
| 6 | 10 | 0.75 | very fine uniform |
| 7 | 10 | 0.75 | very fine uniform |
| Comparative 1 | 20 | 2 | medium to large not uniform |
| Comparative 2 | 15 | 2.25 | fine uniform |
| Comparative 3 | 20 | 2.25 | medium to large not uniform |
| Comparative 4 | 10 | 0.75 | fine uniform |

All foams of Examples 1-7 had a density of 25±3 Kg.m$^{-3}$. The cell sizes varied according to the amount of fluorochemical surfactant used. Furthermore, using the perfluoro N-methyl morpholine and fluorochemical surfactant (Example 1) according to the present invention produced a foam having a finer cell size than a comparable foam prepared using n-perfluorohexane hexane and a fluorochemical surfactant (Comparative Example 2). Whether using perfluoro N-methyl morpholine with only a silicone surfactant (Comparative Example 1) or n-perfluorohexane with only a silicone surfactant (Comparative Example 3), the cell size of the foamed plastic was not uniform and the cells tended to be medium to large sized. As illustrated from Table 1, the use of perfluoro N-methyl morpholine and a fluorochemical surfactant produced a very fine-celled, uniform rigid polyurethane foam.

Various modifications and alterations of this invention will be become apparent to those skilled in the art without departing from the scope and principles of this invention, and it should be understood that this invention is not to be unduly limited to the illustrative embodiments set forth hereinabove.

We claim:

1. A blowing agent emulsion comprising:
   (a) at least one high molecular weight compound with at least two reactive hydrogens atoms,
   (b) at least one low boiling, N-aliphatic, cyclic aminoether blowing agent, and
   (c) fluorochemical surfactant.

2. The blowing agent emulsion of claim 1 further comprising a silicone surfactant.

3. The blowing agent emulsion of claim 1 further comprising chain extenders and/or crosslinking agents.

4. The blowing agent emulsion of claim 1 further comprising at least one catalyst.

5. The blowing agent emulsion according to claim 1, wherein said blowing agent comprises a low boiling, 5- or 6-membered perfluorinated, N-aliphatic cyclic aminoether represented by the general formula:

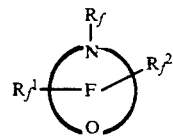
(I)

wherein $R_f$ is a perfluoroaliphatic, saturated or unsaturated group having 1 to 4 carbon atoms, $R^1_f$ and $R^2_f$ are independently, a fluorine atom and a perfluoroaliphatic, saturated or unsaturated group having 1 to 4 carbon atoms, the total carbon atom content of said blowing agent is less than or equal to 12 carbon atoms.

6. The blowing agent emulsion according to claim 5, wherein said blowing agent is a perfluorinated, N-aliphatic morpholine and is represented by the general formula:

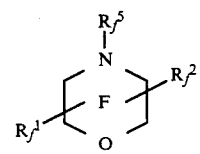
(II)

wherein $R_f$ is a perfluoroaliphatic, saturated or unsaturated, group having 1 to 4 carbon atoms, $R^1_f$ and $R^2_f$ are, independently, a fluorine atom or a perfluoroaliphatic, saturated or unsaturated group having 1 to 4 carbon atoms, the total carbon atom content of said blowing agent is less than or equal to 12 carbon atoms.

7. The blowing agent emulsion according to claim 5, wherein said blowing agent is a mixture of perfluorinated, N-alkyl, 2,5-aliphatic-substituted-1,3-oxazolidine and perfluorinated, N-alkyl, 2,5-aliphatic-substituted-1,3-oxazine and is represented by the following formulae:

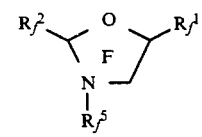
(III)

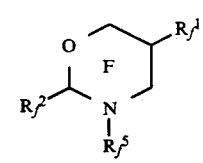
(IV)

wherein $R^5_f$ is a perfluorinated alkyl group having 1 to 4 carbon atoms, $R^1_f$ and $R^2_f$ are independently, a fluorine atom or a perfluoroaliphatic, saturated or unsaturated group having 1 to 4 carbon atoms, the total carbon atom content of said blowing agent is less than or equal to 12 carbon atoms.

8. The blowing agent emulsion of claim 1, wherein said blowing agent is selected from the group consisting of at least one perfluorinated, N-aliphatic, 1,3- or 1,4- cyclic aminoether, a mixture of said perfluorinated N-aliphatic, 1,3- or 1,4- cyclic aminoethers, and a mixture of at least one perfluorinated N-aliphatic, 1,3- or 1,4- cyclic aminoether and at least one of a hydrocarbon, a halohydrocarbon, a chlorofluorocarbon, or a perfluorinated compound.

9. The blowing agent emulsion according to claim 8, comprising
(a) 80 to 150 parts by weight of a higher molecular weight compound with at least two reactive hydrogen atoms,
(b) 1 to 50 parts by weight of the blowing agent according to claim 8,
(c) 0.01 to 10 parts by weight of a fluorochemical surfactant,
(d) 0 to 10 parts by weight of a silicone surfactant,
(e) 0 to 50 parts by weight of water, and
(f) a catalytically effective amount of catalyst.

10. The blowing agent emulsion according to claim 5, wherein said blowing agent is perfluoro N-methyl morpholine.

11. The blowing agent emulsion according to claim 5, wherein said blowing agent is N-ethyl-2-methyl-1,3-oxazolidine.

12. A foamed plastic comprising the reaction product of the blowing agent emulsion of claim 5 and an organic and/or modified organic polyisocyanate.

13. A process for preparing a foamed plastic comprising the steps:
(a) admixing an organic and/or modified organic polyisocyanate and at least one high molecular weight compound with at least two reactive hydrogen atoms, in the presence of
(1) at least one low boiling, perfluorinated, N-aliphatic cyclic aminoether,
(2) a catalyst, and
(3) a fluorochemical surfactant.

14. The process according to claim 13, further including the steps of
(a) emulsifying at least one of said high molecular weight compound with at least two reactive hydrogen atoms, said low boiling, perfluorinated, N-aliphatic cyclic aminoether blowing agent, said catalyst, and said fluorochemical surfactant, and
(b) adding said emulsified mixture to said organic or modified organic polyisocyanate.

15. The process according to claim 13 or 14, wherein said low boiling, perfluorinated, N-alkyl, aliphatic-substituted, cyclic aminoether blowing agent is represented by the general formula:

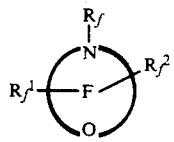
(I)

wherein $R_f$ is a perfluoroaliphatic, saturated or unsaturated group having 1 to 4 carbon atoms, $R^1_f$ and $R^2_f$ are, independently, a fluorine atom and a perfluoroaliphatic, saturated or unsaturated group having 1 to 4 carbon atoms, the total carbon atom content of said blowing agent is less than or equal to 12 carbon atoms.

16. The process according to claim 15, wherein said blowing agent is a perfluorinated, N-alkyl morpholine and is represented by the general formula:

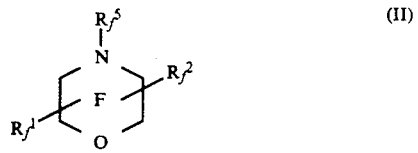
(II)

wherein $R_f$ is a perfluoroaliphatic, saturated or unsaturated group having 1 to 4 carbon atoms, $R^1_f$ and $R^2_f$ are, independently, a fluorine atom or a perfluoroaliphatic, saturated or unsaturated group having 1 to 4 carbon atoms, the total carbon atom content of said blowing agent is less than or equal to 12 carbon atoms.

17. The process according to claim 15, wherein said blowing agent is a mixture of perfluorinated, N-alkyl, 2,5-aliphatic-substituted-1,3-oxazolidine and perfluorinated, N-alkyl, 2,5-aliphatic-substituted-1,3-oxazine and is represented by the following formulae:

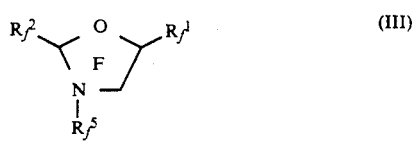
(III)

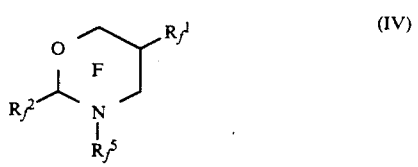
(IV)

wherein $R^5_f$ is a perfluorinated alkyl group having 1 to 4 carbon atoms, $R^1_f$ and $R^2_f$ are, independently a fluorine atom or a perfluoroaliphatic, saturated or unsaturated group having 1 to 4 carbon atoms, the total carbon atom content of said blowing agent is less than or equal to 12 carbon atoms.

18. The foamed plastic according to claim 16, wherein said blowing agent is perfluoro N-methyl morpholine.

19. An article insulated by the foamed plastic of claim 12.

20. A method for preparing a foamed plastic using at least one perfluorinated, N-aliphatic, 1,3- or 1,4- cyclic aminoether as a blowing agent.

* * * * *

UNITED STATES PATENT AND TRADEMARK OFFICE
CERTIFICATE OF CORRECTION

PATENT NO. : 5,162,384

DATED : November 10, 1992

INVENTOR(S) : John G. Owens, et al.

It is certified that error appears in the above-identified patent and that said Letters Patent is hereby corrected as shown below:

On the title page under Inventors, Replace inventor "Rudolf J. Danis" with --Rudolf J. Dams--

Col. 2, line 41, Replace "phases" with --phased--

Col. 3, diagram 1, Replace "$R_f^1$" and "$R_f^2$" with --$R^1_f$-- and --$R^2_f$--

Col. 4, diagram 2, Replace "$R_f^1$" and $R_f^2$" with --$R^1_f$-- and --$R^2_f$--

Col. 4, diagram 3 and 4, Replace "$R_f^2$", "$R_f^1$" and $R_f^5$" with --$R^2_f$--, --$R^1_f$--, and --$R^5_f$--

Col. 5, diagrom 5 and 6, Replace "$R_f^4$" with --$R^4_f$--

Col. 9, line 30-32, Insert a hard return after "surfactant," and insert a hard return after "surfactant, and"

Col. 14, line 5, Replace "$R_f^1$" and "$R_f^2$" with --$R^1_f$-- and --$R^2_f$--

Col. 14, line 20, Replace "$R_f^5$", "$R_f^2$" and "$R_f^1$" with --$R^5_f$--, --$R^2_f$--, and --$R^1_f$--

Col. 14, lines 40-53, Replace "$R_f^5$", "$R_f^2$" and "$R_f^1$" with --$R^5_f$--, --$R^2_f$--, and --$R^1_f$--

Col. 15, lines 45-50, Replace "$R_f^1$" and "$R_f^2$" with --$R^1_f$-- and --$R^2_f$--

UNITED STATES PATENT AND TRADEMARK OFFICE
CERTIFICATE OF CORRECTION

PATENT NO. : 5,162,384

DATED : November 10, 1992

INVENTOR(S) : John G. Owens, et al.

It is certified that error appears in the above-identified patent and that said Letters Patent is hereby corrected as shown below:

Col. 16, lines 8-12, Replace "$R_f^1$", "$R_f^2$", and "$R_f^5$" with --$R^1_f$--, --$R^2_f$--, and --$R^5_f$--

Col. 16, lines 26-39, Replace "$R_f^1$", "$R_f^2$" and "$R_f^5$" with --$R^1_f$--, --$R^2_f$--, and --$R^5_f$--

Signed and Sealed this

Fifteenth Day of November, 1994

Attest:

BRUCE LEHMAN

Attesting Officer

Commissioner of Patents and Trademarks